US009716549B2

(12) United States Patent
Dickson et al.

(10) Patent No.: US 9,716,549 B2
(45) Date of Patent: Jul. 25, 2017

(54) FREE SPACE OPTICAL COMMUNICATION TRACKING WITH ELECTRONIC BORESIGHT COMPENSATION AND CO-BORESIGHTED TRANSMIT AND RECEIVE OPTICS

(71) Applicant: SA Photonics, Inc., Los Gatos, CA (US)

(72) Inventors: William C. Dickson, Granville, OH (US); Andrew K. McClaren, Santa Cruz, CA (US); Greg G. Mitchell, Sacramento, CA (US)

(73) Assignee: SA Photonics, Inc., Los Gatos, CA (US)

( * ) Notice: Subject to any disclaimer, the term of this patent is extended or adjusted under 35 U.S.C. 154(b) by 25 days.

(21) Appl. No.: 14/608,133

(22) Filed: Jan. 28, 2015

(65) Prior Publication Data
US 2015/0215040 A1 Jul. 30, 2015

Related U.S. Application Data

(60) Provisional application No. 61/932,679, filed on Jan. 28, 2014, provisional application No. 61/932,681, filed on Jan. 28, 2014, provisional application No. 62/024,336, filed on Jul. 14, 2014.

(51) Int. Cl.
*H04B 10/00* (2013.01)
*H04B 10/112* (2013.01)

(52) U.S. Cl.
CPC ........ *H04B 10/1125* (2013.01); *H04B 10/112* (2013.01); *H04B 10/1123* (2013.01)

(58) Field of Classification Search
None
See application file for complete search history.

(56) References Cited

U.S. PATENT DOCUMENTS

| 3,840,794 | A | * | 10/1974 | Clement | F41G 3/06 318/600 |
| 4,635,299 | A | * | 1/1987 | MacGovern | H04B 10/1125 356/153 |
| 5,465,170 | A | * | 11/1995 | Arimoto | H04B 10/118 398/129 |
| 6,097,522 | A | * | 8/2000 | Maerki | H04B 10/118 398/1 |
| 6,469,815 | B1 | * | 10/2002 | Poon | H04B 10/118 398/131 |
| 6,535,314 | B1 | * | 3/2003 | Mendenhall | H04B 10/118 250/491.1 |

(Continued)

OTHER PUBLICATIONS

PCT International Search Report and Written Opinion, PCT Application No. PCT/US2015/013368, May 7, 2015, 12 pages.

*Primary Examiner* — Ken N Vanderpuye
*Assistant Examiner* — Jai Lee
(74) *Attorney, Agent, or Firm* — Fenwick & West LLP (57) ABSTRACT

Exemplary embodiments described herein include a bi-directional Free Space Optical (FSO) communication unit that may be used in a multi-node FSO communication system. The bi-directional FSO unit may include a co-boresighted optical unit such that received and transmitted beams are coincident through a common aperture. Embodiments described herein may be used to correct or accommodate the alignment errors of the received and transmitted beams.

16 Claims, 4 Drawing Sheets

(56) References Cited

U.S. PATENT DOCUMENTS

| | | | |
|---|---|---|---|
| 6,674,974 B1 * | 1/2004 | Stieger | H04B 10/1121 |
| | | | 250/214 A |
| 6,804,422 B1 | 10/2004 | Bajorins et al. | |
| 6,865,034 B1 * | 3/2005 | Willis | G01J 1/02 |
| | | | 359/820 |
| 7,437,077 B2 | 10/2008 | Wirth et al. | |
| 7,809,278 B2 * | 10/2010 | Morris | H04B 10/1143 |
| | | | 398/129 |
| 2004/0071398 A1 | 4/2004 | Pierce et al. | |
| 2004/0233420 A1 * | 11/2004 | Deflumere | F41G 3/326 |
| | | | 356/139.03 |
| 2005/0100339 A1 | 5/2005 | Tegge, Jr. | |
| 2007/0217795 A1 * | 9/2007 | Otte | H04B 10/112 |
| | | | 398/212 |
| 2007/0290096 A1 * | 12/2007 | Jenkins | F41G 7/226 |
| | | | 244/3.16 |

\* cited by examiner

FREE SPACE OPTICAL COMMUNICATION TRACKING WITH ELECTRONIC BORESIGHT COMPENSATION AND CO-BORESIGHTED TRANSMIT AND RECEIVE OPTICS

PRIORITY

This application claims priority to U.S. Provisional Application No. 61/932,679, filed Jan. 28, 2014; U.S. Provisional Application No. 61/932,681, filed Jan. 28, 2014; and U.S. Provisional Application No. 62/024,336, filed Jul. 14, 2014, each of which is incorporated by reference in its entirety into this application.

BACKGROUND

Figure 1:
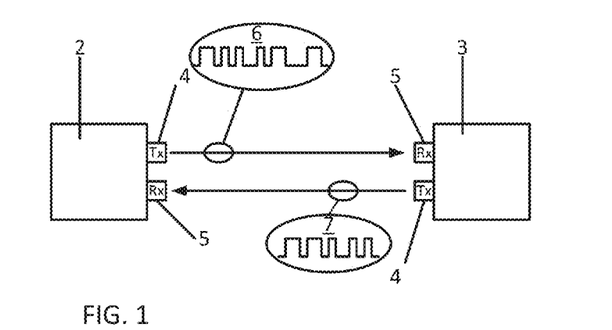
FIG. 1 illustrates an exemplary two-node bi-directional Free Space Optical (FSO) communication system.

In a two-node bi-directional Free Space Optical (FSO) communication system, the two FSO nodes exchange data encoded on optical carrier beams sent across an unobstructed line of sight (LOS) between the two nodes. As shown in FIG. 1, a conventional two-node bi-directional system is illustrated. As shown, a first node 2 and a second node 3 communication by transmitting and receiving a signal 6, 7 sent between the nodes. The data can be encoded on the signals in any matter; a binary, on-off, exemplary signal is illustrated for simplicity. Each node has an optical output 4 for transmitting the desired signal 6, 7, and also an optical input 5 for receiving the transmitted signal. Once received, the internal electronics of the node can decode the signal and obtain the transmitted data.

A Pointing, Acquisition, and Tracking (PAT) control system running on each FSO node maintains the optical alignment of the two beams in the FSO link using local beam steering elements. Each PAT system must keep its transmit (Tx) beam adequately pointed into the other node's receive (Rx) aperture while simultaneously keeping its Rx beam (arriving from the far node) adequately aligned with the local Rx detector. The FSO system is said to be "Tracking" when this two-way alignment is within tolerance for the exchange of data between the two nodes. FSO links require a non-trivial light propagation time proportional to the link distance, which must be considered in the design of the PAT control system. What is needed is a PAT control system that provides high-bandwidth performance for any link distance.

The traditional state-of-the-art PAT approach is the power-peaking approach. This approach requires handshaking of the two communication systems. For example, the transmitter needs to scan its laser beam while the receiver measures the received power. Let D(t) be the direction of the beam as a function of time. After the transmitter finishes the scanning, the receiver analyzes the received signals and determines the time, $t_{max}$, when the signal power was at its maximum. The receiver then sends the transmitter the peak-power time $t_{max}$. The transmitter then steers its beam to $D(t_{max})$. This process introduces time delay, which, for long distance links, degrades alignment performance, which, in turn, degrades communication performance. Also, this process requires the overhead of the handshaking layer itself.

SUMMARY

Exemplary embodiments described herein incorporate a Pointing, Acquisition, and Tracking (PAT) control system running on each FSO node to maintain the optical alignment of the two beams in the FSO link using local beam steering elements and a measurement of an alignment error. Therefore, the FSO unit may be calibrated to determine the alignment error. Once the alignment error is known, the PAT control system may be used to direct the transmit beam based on alignment of a received beam and the determined alignment error. The FSO unit may be recalibrated at any time to update the alignment error. The system may then be aligned using the alignment error to reduce the total time to orient the system. Embodiments described herein may be used in conjunction with conventional alignment schemes or by itself as the primary or sole alignment method.

Exemplary embodiments described herein may incorporate optics to size and position the received beam on an alignment sensor in a desired location having desired characteristics. For example, the optics may resize the receive beam such that the receive beam has a diameter of approximately 30-60% of the alignment sensor.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Although embodiments of this invention have been fully described herein with reference to the accompanying drawings, it is to be noted that various changes and modifications will become apparent to those skilled in the art. Such changes and modifications are to be understood as being included within the scope of embodiments of this invention as defined by the appended claims.

Exemplary embodiments described herein include a bi-directional Free Space Optical (FSO) communication unit that may be used in a multi-node FSO communication system. The bi-directional FSO unit may include a co-boresighted optical unit such that received and transmitted beams are coincident through a common aperture. Embodiments described herein may be used to correct or accommodate the alignment errors of the received and transmitted beams.

Although embodiments of the invention may be described and illustrated herein in terms of free space optical communication systems, it should be understood that embodiments of this invention are not so limited, but are additionally applicable to other receive and transmit configurations in which common components are used for the input and output path that may see an error between the ideal alignment and the actual alignment of those paths. Furthermore, although embodiments of the invention may be described and illustrated herein in a specific optical configuration, it should be understood that embodiments of the invention may include any optical alignment and additional optical components necessary to create the desired configuration, including beam splitters, prisms, mirrors, lenses, diffusers, diffraction gratings, and any combination thereof.

Co-Boresighted FSO Unit

Figure 2A:
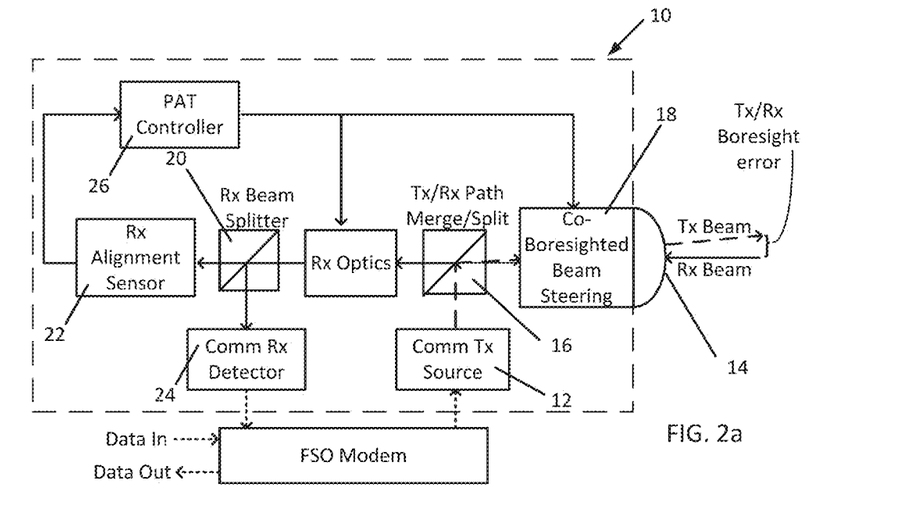
FIGS. 2a and 2b illustrate exemplary bi-directional FSO communication units.

FIG. 2a illustrates an exemplary FSO unit 10 providing a common optical path for the FSO transmit (Tx) and receive (Rx) beams through a common aperture. In an exemplary embodiment, a combination of beam steering optics including, but not limited to, beam splitters, prisms, mirrors, lenses, diffraction gratings, and any combination thereof, may be used to align the received beam with the transmit beam through a common aperture.

As shown in FIG. 2a, the transmitted and received data is handled through the FSO modem by conventional methods known in the art. Data is sent and received by the FSO modem by electrical signals. The modem interacts with the transmitter source to send the data in an optical code or receives data from the receiver detector that sensed an incoming optical code. Any conventional methods of data handling and conversion are within the scope of the present invention.

The FSO unit 10 includes a transmitter source 12 in communication with the FSO modem that outputs an optical signal encoded with the desired data to transmit to a remote FSO unit. The optical transmit beam is directed out an aperture 14. One or more optical components may be used to steer the beam along the desired path from the transmit source through the aperture 14. As shown, the beam is directed out of the aperture through a beam merge/splitter 16.

The FSO unit 10 receives the Rx beam from the remote FSO unit through the same aperture 14 from which the Tx exited the FSO unit. The FSO unit 10 receives a wide light beam through the aperture 14. The co-boresighted beam steering unit 18 receives the Rx beam and focuses it to a smaller size for directing through the unit. The co-boresighted beam steering unit also aligns the desired incoming beam with the internal optics that are ultimately in line with the detector. The co-boresighted beam steering unit 18 may use common optical components to direct the Tx and Rx beams from the aperture to the internal optical components, such as the source and/or detector(s).

The received beam traverses the same beam merge/splitter 16. The beam merge/splitter 16 is one or more optical components that permit the Tx and Rx beams to be merged on one side such that common optical components may be used to direct and receive the Tx and Rx beams respectively through the same aperture 14 (i.e. the co-boresighted beam steering unit 18). The beam merge/splitter 16 is also configured to slit the Tx and Rx beams such that they can be generated and detected, respectively, separately. The separation of the Tx and Rx beams along a portion of their internal path within the FSO unit permits the received signal to be processed without interference of the transmitted beam. In general, the transmit beam will have a greater intensity compared to the received beam. Therefore, to prevent the transmit beam from overpowering the received signal, the beams are separated before the received signal is detected and processed, and therefore removes interference between the beams.

In an exemplary embodiment, the received beam is passed through the merge/splitter 16. For example, the merge/splitter may be a dichromic beam splitter, such that a beam at a first wavelength is reflected or redirected, while a beam at a second wavelength is transmitted or passed. As shown, the Tx beam is reflected at an angle from the incoming beam and therefore bent toward the aperture 14, while the Rx beam is passed through and proceeds to the remaining Rx optics. As such, the Tx and Rx beams are merged on the aperture side of the merge/splitter 16, and separated on different faces of the merge/splitter. The received beam is then split by a beam splitter 20 between an alignment sensor 22 and the detector 24. In an exemplary embodiment, the beam splitter 20 is a 50/50 beam splitter such that the beam is divided into two separate paths. A portion of the beam is therefore transmitted through the optic, while a second portion of the beam is reflected at an angle to the incoming beam.

Embodiments of the FSO unit may therefore comprise a system of sending data on a transmitted optical beam at a first wavelength and receiving data on a received optical beam at a second wavelength different from the first wavelength. A first set of internal optics may be used to steer both the transmitted and received beams along a portion of a path interior to the FSO unit. A second set of internal optics may be used to separate the transmit beam from the received beam for a second portion of the respective paths of the beams. A third set of internal optics may be used to generate the transmit beam having one or more characteristics, including wavelength, intensity, size, orientation, etc. A fourth set of internal optics may be used to detect the received beam and obtain the data from the optical code. A fifth set of internal optics may be used to align the system using the received beam location. The described set of optics may be one or more optics to achieve the specific functions. The set of optics may be separated into one or more additional sets of optics and/or be combined with one or more other sets of optics to achieve the same set of functions with more or less component duplication or integration. The described set of optics may be enclosed within a housing such that the internal optics are inaccessible for manual manipulation once enclosed.

Ideally, the transmit and receive beams are parallel or along the same axis when entering/exiting the aperture of the co-boreseighted beam steering unit 18. The co-boresighted beam steering unit 18 is used to direct the Rx and Tx beams to/from the unit along that same path. In the illustrated embodiment, two beams (Rx and Tx) are directed through the co-boresighted aperture and into/from the FSO unit 10. The Tx and Rx beams may be different wavelengths such that they respond differently to one or more internal optical components. The exemplary embodiment separates the beams with optical components. Therefore, a portion of the Tx and Rx path lengths internal to the FSO unit are coincident and thus use the same optical components, and another portion of the Tx and Rx paths are separated. The Co-boresighted beam steering unit 18 includes optical beam steering components to direct the exiting/incoming beams such that the beams are directed toward a remote node FSO unit and still align with the internal optical components, such as the transmit source and receive detector. The Co-boresighted beam steering unit 18 may also include one or more optical components, such as filters, mirrors, lenses, etc. that may be used to manipulate the received or transmitted beams. For example, the co-boresighted beam steering unit may include optical components to receive light through the aperture 14 and focus the light to a reduced beam diameter.

When the requirements of the FSO communication system allow the Tx and Rx apertures to be the same size, the use of coboresighted Tx/Rx optics provides significant size, weight, and power (SWaP) savings as well as lower system complexity and cost compared to the use of independent Tx and Rx optical paths with double the focusing and steering elements.

The beams may be changed with respect to their respective positions or may be repositioned as desirable to fit within the FSO unit. For example, the received beam may be redirected, while the transmitted beam is redirected in another direction or passed through the beam steering optics. Additional directional optics may also be used as necessitated by the desired housing configuration.

The alignment of the optical components themselves is generally performed during manufacture and before being enclosed in a housing. It is therefore cumbersome and difficult to correct beam alignment after enclosing the optical components within the housing. In addition, as the co-boresighted beam steering unit uses common optical components to direct the beams, their paths should be the same. However, as illustrated in FIG. 2a, unavoidable small boresight errors between the local Tx source and the local Rx alignment sensor and/or detector result in the outgoing Tx beam not being parallel to the incoming Rx beam. Therefore, when the Rx sensor signal is nulled, ideally the transmit sensor is pointing directly at the remote FSO unit along the same path as the Rx beam. However, in reality the Tx beam is not properly directed for point-ahead long link lengths. As a result, the Tx beam does not point directly at the far node. The illustrated transmit and receive boresight error is exaggerated over a short distance for illustrative purposes only. However, even for very misalignments, the error can be egregious when the remote FSO unit is a substantial distance away. What is needed is an approach to compensate for the small boresight error between the local Tx source and local Rx alignment sensor used with the co-boresighted Tx/Rx FSO optics to yield improved alignment of the local Tx beam onto the far node's Rx aperture after the optics are enclosed within a housing, or after the node is positioned for use in the field.

One approach to compensate for the Tx/Rx boresight error when using co-boresighted Tx/Rx optics is to include an extra beam steering element in the Tx and/or Rx paths behind the co-boresighted part of the paths, such as near the Tx source or near the Rx alignment sensor. The beam steering element may be controlled remotely through one or more electrical or other signals received by the steering element, either through a wired or wireless connection. However, the extra beam steering element would increase system SWaP, complexity, and cost.

Figure 5:
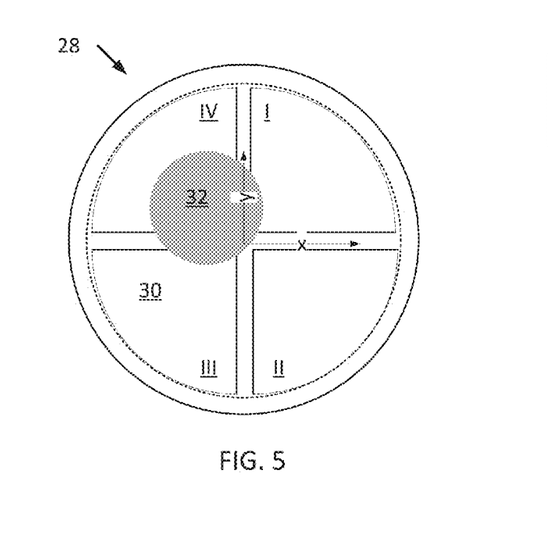
FIG. 5 illustrates an exemplary position sensitive detector and incoming beam.

A conventional sensor/detector used within the FSO unit is a quad cell photodetector, in which the sensor/detector surface is divided into four quadrants. Each quadrant then detects an optical signal received from the Rx Beam. FIG. 5 illustrates an exemplary quad cell photodetector with four quadrants 30. When the beam 32 is directed onto the detector, a signal is received at each quadrant proportional to the relative portion of the beam on the individual quadrant. For example, as illustrated in FIG. 5, the received signal at quadrant IV will be the greatest, with quadrant III and then I following, while quadrant II may not pick up any signal at all. The offset on the detector can then be determined by comparing the signals at the respective quadrants. A quad cell photodector is illustrated herein, but any divided photodetector of 2 or more portions or cells may be used to detect misalignment. Other position sensitive detectors or similar devices may also be used.

The Rx alignment sensor 22 may be a position sensitive detector, such as the quad cell photodetector, which can detect differences in the location of the focused beam on the detector. The PAT controller 26 may receive the alignment information from the received alignment sensor 22 and adjust the corresponding optics to properly align the system. Accordingly, the FSO unit 10 may include a feedback loop so that the transmit and receive beam paths are properly aligned out of the aperture 14.

For example, Rx optics 28 illustrated on FIG. 2a may include one or more beam steering elements to compensate for the misalignment detected at the received alignment sensor. The optics may include, for example, a fast steering mirror (FSM) that may make small corrections with short response time, such as to correct for atmospheric effects. A combination of elements may also be used, such as a beam director (BD) to handle large-angle low-bandwidth steering and a FSM to handle small-angle high-bandwidth steering. The alignment optics may be positioned anywhere along the transmitted or received beam path, such as behind the aperture within the co-boresighted beam steering unit 18 or outside of the co-boresighted beam steering unit 18 such as along either the independent, separated Rx or Tx paths.

An exemplary "electronic" boresight compensation (EBC) approach may alternatively or additionally be used to compensate for the Tx/Rx boresight error when using co-boresighted FSO Tx/Rx optics. The received beam may be steered to a non-zero Rx alignment sensor value that results in the outgoing transmit beam being properly pointed toward the far node.

Figure 6:
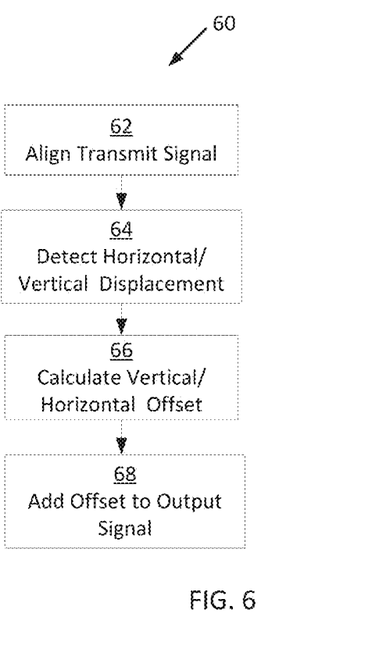
FIG. 6 illustrates an exemplary electronic boresight compensation and alignment approach.

FIG. 6 illustrates an exemplary electronic boresight compensation approach. The PAT controller adjusts the steering angle of the co-boresighted beam-steering system to drive the internal Rx beam angle and thus the Rx alignment sensor output to the non-zero Rx alignment offset command value. The offset command value may be a value greater than zero, or if all of the optics are properly aligned, the offset command value may include zero. As a result of the co-boresighted steering, the outgoing Tx beam is also tilted by the same amount, with the intent of bringing the Tx beam into alignment with the Rx beam arriving from the far node as shown in FIG. 2b, or to a point-ahead-bias from the Rx beam to account for time delay in long FSO links.

Figure 2B:
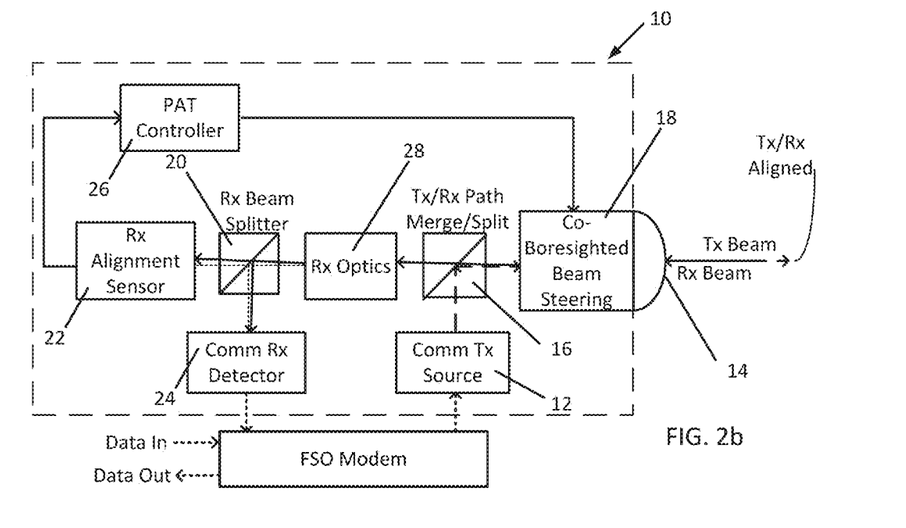

As illustrated in FIG. 2b, controlling the Rx beam to a non-zero Rx alignment sensor value results in a lateral displacement not only in the location of the Rx beam intersecting the Rx alignment sensor 22, but also in the location of the Rx beam intersecting the Comm Rx detector 24. If the Comm Rx detector path includes coupling the Rx beam into a fiber leading to a detector, then fiber coupling loss related to the lateral beam displacement may limit the correctable range of Tx/Rx boresight error using EBC. If the Comm Rx detector has a larger tolerance for lateral beam displacement, such as using an Avalanche Photodetector (APD) having a detection surface with a response independent of location of Rx beam incidence, then the correctable range of Tx/Rx boresight error using EBC can be much larger than the fiber-coupling case. A detector with a response independent of location may still have some dependence, but its dependence is typically larger than the boresight error.

EBC provides a means of compensating FSO Tx/Rx alignment error in a co-boresighted FSO system without the need for additional beam steering element(s). EBC is most advantageous in FSO systems for which the coupling efficiency of the Comm Rx beam into the Comm Rx detector has low sensitivity to the lateral displacement of the Comm Rx beam.

In an exemplary embodiment, the EBC offset must be calibrated. A calibration approach 60 is therefore disclosed in which an electronic offset is calculated and added to correct for the optical misalignment. If the receive beam is offset as indicated in FIG. 5, the misalignment is along two axis (x and y as shown). As illustrated in FIG. 6, the system may first be calibrated, such that the co-boresighted beam steering unit 18 is positioned to align the Tx beam out of the unit with an Rx beam into the unit through the common aperture 14, such that the Tx and Rx beams are parallel and coincident outside of the FSO unit. For example, at step 62, the FSO unit may be positioned such that its Tx beam is centered on a remote FSO unit. The local FSO unit may then receive an Rx signal from that remote unit. The remote FSO unit already has a known offset or is a calibration unit with an offset of 0. Then, at step 64, an offset is detected on the position sensitive detector 22 of the local FSO unit. At step 66, the system may calculate an offset for one or more axis, such as, for example, a vertical and horizontal offset. The calculated offset of the local unit may consider the known offset of the remote unit or if the remote unit is calibrated to zero, then the detected offset is the offset of the local node. At step 68, when the FSO unit is in use, the PAT controller steers the co-boresighted beam steering unit 18 based on an output of the alignment sensor 22 and the offset position. Other methods of obtaining the Tx/Rx boresight error may also be used. The converse may also be used, such that the remote FSO unit is aligned or centered on the receiving detector and the offset is calculated based on the displacement of the transmit beam of the local FSO unit on the remote FSO unit. Again, the remote FSO unit is a calibration unit with either a zero or known offset.

If the detector is a quad cell photodetector, as illustrated in FIG. 5, and the received beam 32 is positioned as illustrated when the transmit beam is aligned with the received beam outside of the FSO unit, the beam misalignment is along two axis, vertically (toward quadrants I and IV), and horizontally (toward quadrants IV and III). The vertical misalignment may be calculated by taking the difference of the received signals from the top quadrants (IV and I) from that of the bottom quadrants (III and II), and normalized by dividing by the sum of all of the quadrants. Similarly, the horizontal displacement may be calculated by taking the difference of the received signals from the quadrants from one side (e.g. I and II) from that of the quadrants on the opposing side (e.g. IV and III), and, again, normalized by dividing by the sum of all of the quadrants. Such that:

$$\alpha = [(V_I + V_{II}) - (V_{IV} + V_{III})]/[V_I + V_{II} + V_{III} + V_{IV}]$$

$$\beta = [(V_{IV} + V_I) - (V_{III} + V_{II})]/[V_I + V_{II} + V_{III} + V_{IV}]$$

When positioning the system during operational use, the unit is oriented and/or the co-boresighted beam steering unit is ideally actuated to drive the x and y calculations to zero. However, if the optics are misaligned, the transmit beam will be misdirect as shown in FIG. 2a. Accordingly, when applying the EBC approach, the co-boresighted beam steering unit is actuated to drive the x and y calculations to zero after compensating for the calibrated offsets or are driven to a non-zero command offset value, such that the beam incident on the alignment sensor is offset as shown in FIGS. 2b and 5. In order to align the Tx and Rx beams outside of the FSO unit, the desired alignment position as seen by the alignment sensor is non-zero. Accordingly, when calibrated, the system may calculate the x, y offsets according to the above equation. However, during use, an offset may be added to the calculated x, y positions as follows, and the system driven according to the compensated values:

$$x = [(V_I + V_{II}) - (V_{IV} + V_{III})]/[V_I + V_{II} + V_{III} + V_{IV}] - \alpha$$

$$y = [(V_{IV} + V_I) - (V_{III} + V_{II})]/[V_I + V_{II} + V_{III} + V_{IV}] - \beta.$$

The offsets may be handled internally such that the alignment position includes the offset values. For example, an electronic signal, e.g. a voltage, may be added to the alignment sensor output equivalent or proportional to the respective $\alpha$, $\beta$ offsets to provide a compensated signal to the PAT controller. Accordingly, the PAT controller determines and actuates the co-boresighted beam steering unit 18 to drive the received signal to zero. Alternatively, the offset may be handled within the PAT controller. For example, the offset values $\alpha$, $\beta$, may be stored and accessibly by the PAT controller such that the PAT controller drives the co-boresighted beam steering unit as positioned by the alignment sensor to the offset values instead of to zero. The PAT controller may also subtract the offset values from location values of the alignment sensor or may subtract some proportional or appropriate offset from the received alignment sensor outputs, and drive the desired position to zero. Therefore, the PAT controller is programmed to drive the system to a redefined zero that is offset from the center of the alignment sensor. Accordingly, when the system is zeroed, the physical system is driven to a non-zero physical location.

In an exemplary embodiment, the offset may be calibrated at any time such that the offset may be reset after the unit optics are enclosed in the housing and inaccessible for further alignment adjustments. Therefore, small alignment deviations may be compensated for over time without requiring physical access to the internal components of the FSO unit.

A diffuser may also or alternatively be used with the FSO unit to defocus the Rx beam on the Rx alignment sensor. In some cases, the Rx beam may be smaller than the gaps between cells of a position sensitive sensor, or may not be large enough to adequately fill more than one cell. When the Rx beam is too small, a precise offset cannot be calculated for use with the EBC approach. For example, if the beam is less than the size of one cell, the beam may only fall on the cell for a number of offsets. However, the position sensitive detector will not be able to distinguish the offsets as there are not signals on other cells to make a comparison. In these cases, a diffusor, or other one or more optical components, may be positioned along the Rx beam path before the Rx alignment sensor. The diffuser, or other one or more optical components, is used to increase the beam size on the sensor cells. In an exemplary embodiment, the diffuser may be positioned to direct the Rx beam on the position sensitive detector to account for the misalignment error.

In an exemplary embodiment the diffuser is positioned along the Rx path only, such as along the portion separated from the Tx beam. In an exemplary embodiment, the diffuser is positioned between the splitter and alignment sensor, such that it is along the path only to the alignment sensor and separate from the path to the Rx detector. Alternatively, the diffuser may be positioned along the common path to bother detectors, such that a diffused beam is received by both the alignment sensor 22 and the detector 24.

The diffuser may smooth the intensity structure of the Rx beam such that the PAT controller is not responding to unintentional signals or noise of the Rx beam. For example, the received signal may scintillate from atmospheric effects, transmit noise, or other interference. The diffuser may act to smooth the detected scintillation. Accordingly, in an exemplary embodiment, a diffuser is positioned along the Rx beam when the Tx and Rx beams are separated, such as between the beam merge/splitter and the alignment sensor.

In an exemplary embodiment, the diffuser is configured and positioned to create a spot size of approximately 30-60%, more preferably 40-50%, or approximately 50% of the diameter of the detector. The diameter of the detector may be the diameter of a sensing face, which may be defined as the outer perimeter enclosing the sensing cells of the detector (identified in FIG. 5 by the dotted circle) or the exterior outer perimeter of a surface of the detector supporting the detector cells (identified in FIG. 5 as the outer-most solid line). The outer perimeter need not be circular, but is shown as such for illustration only. The beam may also be resized relative to the size of one or more of the cells of the position sensitive detector. For example, the beam may be sized to roughly the same size or just larger than a cell of the position sensitive detector. In an exemplary embodiment, the beam may be sized to 95-110% of the surface area of an individual cell of the position sensitive detector. The beam from the diffuser should be centered as much as possible on the alignment sensor, when the Rx and Tx paths are coincident external the FSO unit. The diffuser may also be selected such that it does not diffuse too much of the light so the intensity and therefore sensitivity is not adversely affected.

In an exemplary embodiment, the system may work on a closed-loop control at each FSO node to adjust the local node's beam steering elements to regulate the locally measured receive (Rx) wavefront tip/tilt at a commanded value. The PAT control system may null the error between the tip/tilt measurement provided by the local receive alignment sensor 22 and the local commanded tip/tilt. A non-zero received beam wavefront tip/tilt command can be used to correct the Tx/Rx boresight errors and to provide point-ahead for long links. Each terminal's control system may use the local Rx tip/tilt error signal to drive the local steering angles to null the local Rx tip/tilt error. Since the transmit (Tx) and receive (Rx) paths traverse common steering elements and are nominally parallel in opposite directions, each terminal's transmit beam will point toward the remote FSO terminal with a bias angle equal to the net combination of local Tx/Rx boresight error, the local commanded tip/tilt, and any asymmetric steering induced by atmospheric effects between the two FSO terminals.

The benefit of this PAT approach is that the alignment control system for the two-terminal FSO link is decoupled into independent control loops running on each terminal and closed using local measurements only, thus avoiding the extra complexity of cross-terminal communication used in previous FSO PAT systems. Since the time delay incurred when closing the control loop through the far terminal is avoided, the resulting closed-loop bandwidth of this locally closed tracking control system is limited only by the bandwidths of the Rx wavefront tip/tilt sensor and the steering elements, and by any limitations imposed by the control law or processor.

In the co-boresighted case, the alignment of the outgoing Tx beam with the Rx aperture of the far node is accomplished indirectly by aligning the co-boresighted incoming Rx beam with the local alignment detector. The co-boresight approach may be used to avoid the far node having to communicate Tx alignment data back to the local node, which would require the extra system burden of an additional data channel, and, for long links, the optical transport delay may be too large to provide suitable Tx alignment bandwidth. For example, when the Rx sensor signal is nulled (with or without the use of the EBC approach), the Tx beam is pointing directly at the remote FSO unit along the same path as the Rx beam. Accordingly, a position sensitive alignment sensor 22 can be used to properly position the FSO unit without communicating with the remote FSO unit.

Properly aligning the local Tx and Rx paths can also permit an improved FSO Acquisition approach for stationary or on the move (OTM) FSO systems that can accommodate large location and attitude uncertainty and complete the acquisition process in as short of time as possible to maximize the time spent transferring data during the potentially short periods of unobstructed line of sight (LOS).

With adequate alignment tolerance and proper point-ahead between each node's local Tx and Rx paths, optical alignment between the two FSO nodes resulting in one node's Rx detector sensing the Tx light from the far node will have the symmetric effect of pointing the local co-boresighted Tx beam at or near the other node's Rx aperture. Exemplary FSO Acquisition approaches described herein may use this coboresighted symmetry (with or without use of the EBC approach) to avoid the need for separate steering elements for the Tx and Rx beams and the associated need for a given node to be given alignment data from the far node in order to point its Tx beam at the far node. Such a round-trip alignment approach would require communication channels between the nodes, which would add extra complexity to the FSO system and would suffer from time delay that would limit the performance of the acquisition process for longer links.

In an exemplary approach, the PAT system on each node uses the local beam steering elements to scan a solid angle of space with an extent large enough to accommodate uncertainties in location and attitude of the two nodes. The PAT system looks for Rx light sent from the other node using a local acquisition sensor that provides a measurement of power as well as wavefront tip and tilt. The acquisition sensor may or may not be the same device as the FSO communication Rx detector.

Adequate detected power on the local acquisition sensor implies that the far node is presently (ignoring time delay) pointing at the local node, and, by symmetry of the coboresighted design, that the local Tx beam must also be pointed at or near the far node. Once the local PAT system detects this above-threshold level of power, the PAT system uses the acquisition sensor's tip/tilt measurements to adjust the beam steering elements to drive the tip/tilt errors closer to zero to support low-loss detection at the FSO communication Rx detector.

The "Acquisition" mode gives way to a "Tracking" mode when the alignment errors are within system-dependent tolerances of the FSO communication system. Adequately low alignment errors may require the use of a separate Tracking sensor with, for instance, smaller FOV, higher bandwidth, and lower noise than the acquisition sensor. The transition from "Acquisition" to "Tracking" mode in this two-sensor design may or may not coincide with the handoff from one sensor to the other. For instance, the alignment errors may need to be driven closer to zero by the tracking sensor before the FSO communication Rx detector is achieving adequate signal to noise (SNR).

Figure 3:
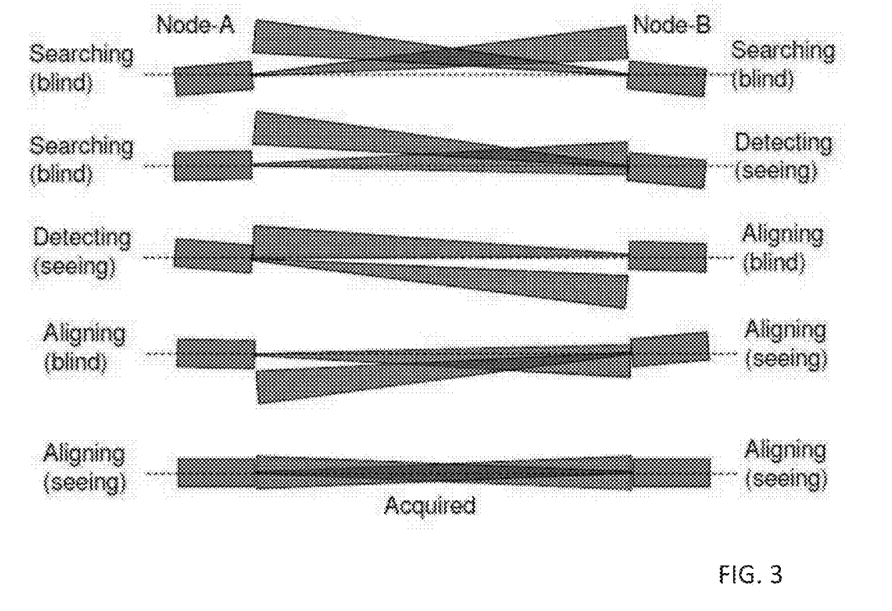
FIG. 3 illustrates an exemplary acquisition approach.

FIG. 3 illustrates the acquisition approach. In the top frame of this example, the Tx/Rx line of sight (LOS) of each node is misaligned such that each Tx beam is missing the other node and each node is therefore "blind" (no light seen). Both nodes scan their LOS with the goal of causing the outgoing Tx light to intersect the other node's Rx aperture. In the second frame, the Node-A Tx beam passes by the Node-B Rx aperture—Node-A is still blind, but Node-B momentarily detects the incoming light allowing Node-B to compute its local LOS alignment error. In the third frame, Node-A has continued its scan past Node-B, but Node-B (now blind again) has adjusted its LOS based on the momentary detection from the second frame, and now Node-A is seeing light from Node-B such that Node-A can compute its own local LOS error. In the fourth frame, the Node-B beam has wandered off Node-A so Node-A is blind again, but Node-A has adjusted its LOS based on the momentary detection from the third frame, and now Node-B is again seeing light from Node-A such that the Node-B can compute its own local LOS error once again. In the last frame, Node-B has adjusted its LOS again such that its Tx beam is seen by Node-A. At this point, the nodes see light from each other and are considered "Acquired" or "Tracking".

Properties of the two nodes such as Tx divergence and Rx tip/tilt sensor field of view (FOV) influence the behavior, speed, and robustness of the acquisition process illustrated in FIG. 3. For instance, if both nodes have a large Rx FOV and large Tx divergence relative to alignment errors, then both nodes will "see" each other's Tx beams and will immediately acquire with no scanning needed. If one node has a large Rx FOV but the other node does not, the node with the large FOV can simply point its LOS in the expected direction of the other node and wait for the other node to eventually scan its Tx beam into alignment, at which time the large-FOV node adjusts its LOS into alignment with the other node to complete the acquisition (with one or more iterations depending on scan and adjustment speeds). If both nodes have a small FOV, both nodes will need to scan looking for light from the other, and this process would require careful scan design to address the need for simultaneous alignment between the two LOS vectors.

Figure 4:
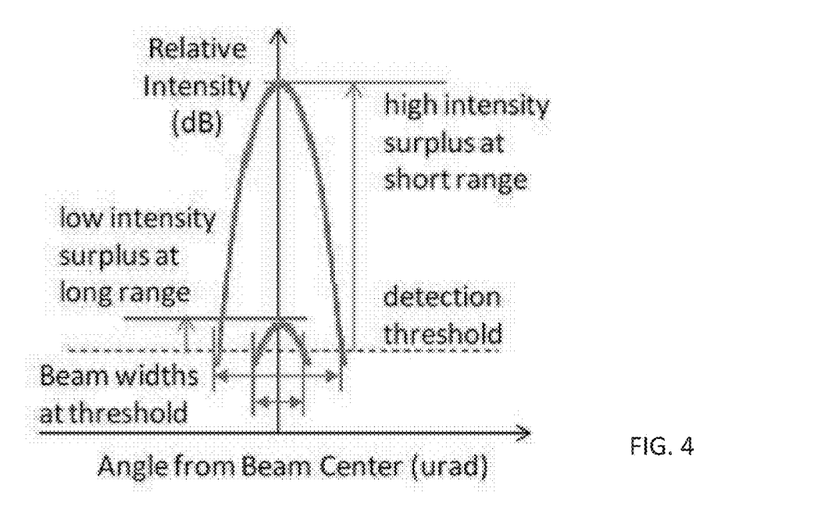
FIG. 4 illustrates an exemplary range-dependent intensity surplus.

The "Intensity Surplus" indicates the optical margin between the detection threshold of a Rx tip/tilt sensor and the peak intensity of the ideal Gaussian beam arriving from the far node. FIG. 4 illustrates the range-dependent Intensity Surplus defined as $\sigma_I$.

For a given Tx Gaussian beam width and Rx detection threshold, a larger intensity surplus $\sigma_I$ means the beam intensity is above the detection threshold out to larger angles from the beam center, as evident in FIG. 4 by the larger angles where the intensity intercepts the detection threshold. Detectable beam width can be calculated using a beam propagation model that accounts for intensity drop due to beam expansion, atmospheric loss, and other relevant factors. This "detectable beam width", rather than the Gaussian beam width, is the relevant beam-size parameter to be used in calculation of acquisition search time.

Figure 7:
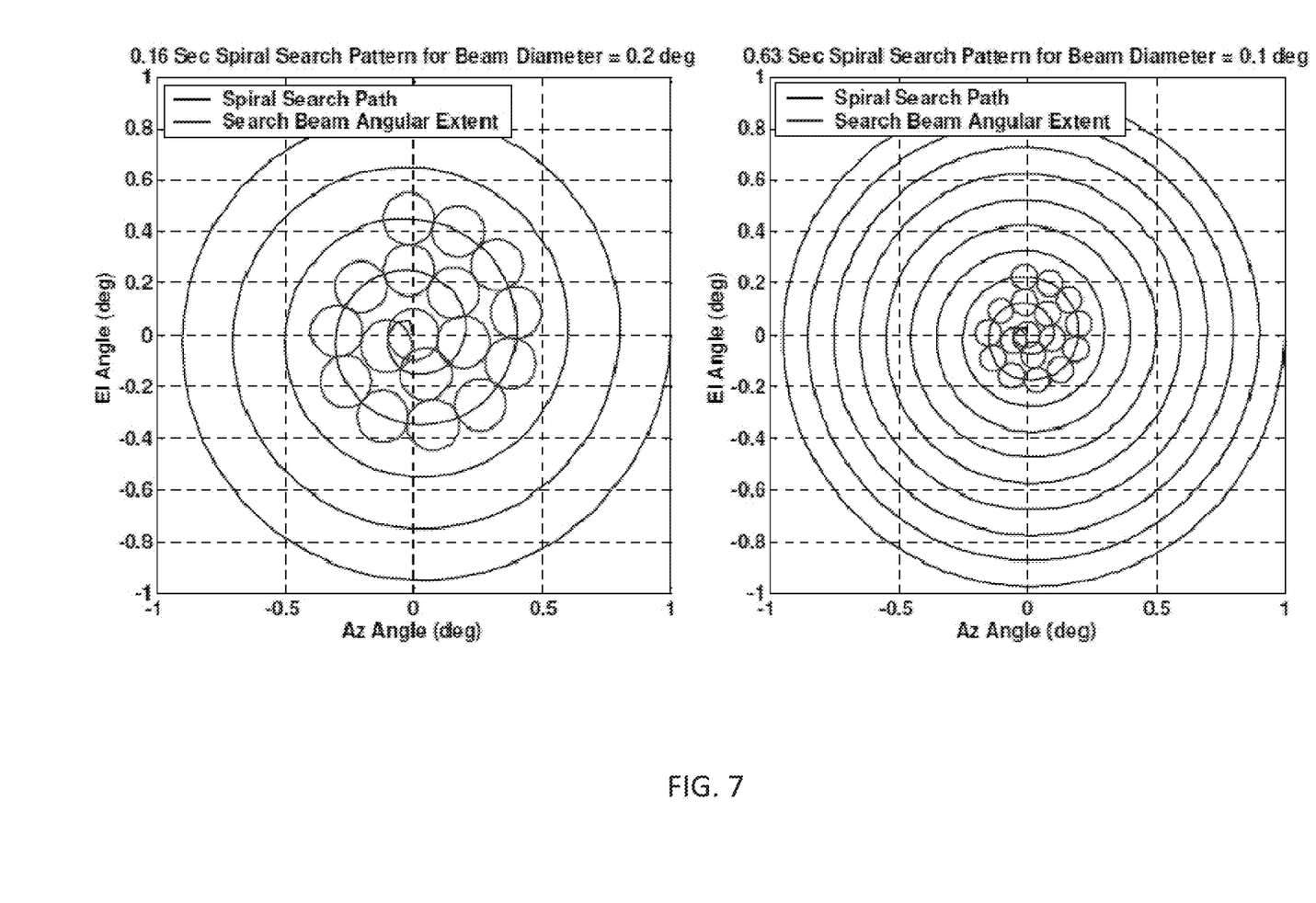
FIG. 7 illustrates two exemplary spiral search paths that may be used herein.

The spiral path is a convenient and natural approach for FSO acquisition. FIG. 7 illustrates two spiral search paths for the same search radius of 1 degree, but using beam diameters 2× different than each other as defined by the detection-threshold intensity as described above.

A larger beam diameter allows a spiral pattern with more widely separated orbits, which reduces the search time by 4× compared to the 2× smaller beam as described as follows.

The time Tsp required for a node to traverse its spiral search path is given by:

$$T_{sp} = \pi T_{avg} N^2$$

where N is the number of spiral loops given by:

$$N = \text{SearchRadius/BeamDiameter}$$

and $T_{avg}$ is the minimum time period over which the average intensity profile of the node's Tx beam at the plane of the far node resembles the Gaussian beam that would have been observed with no atmospheric turbulence. The search time $T_{sp}$, given by the above equation, assumes that the search beam traverses the spiral search path at a constant rate of one beam diameter per $T_{avg}$ to allow time for any turbulence-induced intensity concentrations to adequately populate the spatial extent of the search swath. The temporospatial character of the projected Tx beam across the scanned solid area can be described as a small-angle rapidly evolving two-dimensional random turbulence pattern (at the scale of the beam diameter) traversing the large-angle slowly moving two dimensional search spiral.

If the local node's spiral is too rapid, the turbulence pattern may be such that the turbulence induced intensity concentrations miss the far node's Rx aperture as the beam spirals by, in which case the local node would need to spend time repeating the search once the unsuccessful search has completed. If the local node's spiral is slower than is needed to guarantee that the far node's Rx aperture successfully sees the local node's Tx light, then the search time will be larger than is necessary. Clearly, optimizing the search speed is critical in achieving the shortest acquisition search time, and this optimization is gated by the correct choice of the turbulence parameter $T_{avg}$.

In cases where turbulence is negligible or non-existent, such as in space, the turbulence parameter $T_{avg}$ would go to or near zero, which would imply a nonsensical spiral time of zero or near-zero. In these cases, the parameter $T_{avg}$ would be used to represent the limiting constraint on search speed, such as the maximum achievable speed or acceleration of steering elements, or to represent a lower limit on the time needed by the far node to detect the "blip" of power as the local node spirals its beam past the far node's Rx aperture.

The exemplary acquisition approach does not require signaling between the FSO nodes. It uses a decoupled bilateral spiral search and Tx/Rx beams that are co-boresighted with respect to the beam steering elements such that actions taken by each node can depend only on the reception of optical signal from the other node. Each node can react immediately upon detection of power from the far node to adjust the local node's steering elements to null the FSO alignment errors of the co-boresighted Tx/Rx. This approach avoids the additional complexity needed for a cross-node signaling protocol, and avoids the performance limitations related to the cross-node time delay. The acquisition spiral speed parameter can be set based on turbulence or other speed limiting constraints, and the spiral separation can be set based on power surplus of the transmitted power at the range of the far node. The correct choice of these parameters provides a minimum-time acquisition spiral to allow the maximum time for FSO communication.

Some portions of the detailed descriptions above are presented in terms of algorithms. These algorithmic descriptions are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The signals may be stored as machine readable code on a memory device and executed by a processor to perform the described functions.

Accordingly, for example, the FSO unit may include a system processor, memory, and a plurality of software routines stored on the memory and executed by the processor to perform the algorithms and methods described herein. The processor and memory may be within the PAT controller for example. The FSO unit may also include input and/or output circuitry to enable a user to interface with the FSO unit.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

The invention claimed is:

1. A Free Space Optical (FSO) communication unit, comprising:
    co-boresighted beam steering unit configured to transmit and receive optical beams along a coincident path external to the FSO communication unit;
    a separator to direct the transmit optical beam and the receive optical beam along separate paths;
    a transmit beam source for transmitting the transmit optical beam towards a direction;
    a receiver beam detector configured to determine a position of the receive optical beam on the receiver beam detector;
    at least one optical component between the transmit beam source and the receiver beam detector; and
    a Pointing, Acquisition, and Tracking (PAT) control system,
        wherein the PAT control system controls a direction of the transmit optical beam, and directs the transmit optical beam based on the position of the receive optical beam by driving the transmit optical beam to be directed parallel to the receive optical beam based on the position of the receive optical beam minus an offset command,
        the offset command value calculated for the FSO communication unit based on a boresight error between the position of the receive optical beam and the direction of the transmit optical beam, the boresight error caused by the at least one optical component between the transmit beam source and the receiver beam detector.

2. The FSO communication unit of claim 1, further comprising one or more optical components to create the receive optical beam such that a diameter of the receive optical beam on the receiver beam detector is 40-60% of a diameter of the receiver beam detector.

3. The FSO communication unit of claim 2, wherein the one or more optical components includes a diffuser.

4. The FSO communication unit of claim 1, wherein the co-boresighted beam steering unit comprises co-boresighted FSO Tx/Rx optics such that the transmit and receive optical beams are directed along an approximately coincident path internal to the FSO communication unit.

5. The FSO communication unit of claim 1, wherein the PAT control system communicates with the co-boresighted beam steering unit to direct the co-boresighted beam steering unit such that the position of the receive optical beam is located at a non-centered value that results in the transmit optical beam being properly pointed coincident with the receive optical beam external to the FSO communication unit.

6. The FSO communication unit of claim 1, wherein the receiver beam detector is a quad-cell photo detector.

7. The FSO communication unit of claim 6, further comprising a second receiver beam detector that has a detection surface with a response independent of location of Rx beam incidence.

8. The FSO communication unit of claim 7, wherein the separator is a dichromic beam splitter to separate the coincident path of the transmit optical beam and the receive optical beam.

9. The FSO communication unit of claim 8, further comprising a beam splitter such that the receive optical beam is split between the receiver beam detector and the second receiver beam detector.

10. An FSO communication system, comprising the FSO communication unit of claim 1 and a remote FSO communication unit separated over a distance and directed toward each other to communicate data over a line of sight, further comprising a communication link between the FSO communication units such that a Tx/Rx boresight error may be calculated for the FSO communication unit from an offset detected on the receiver beam detector of the FSO communication unit when the transmit optical beam of the FSO communication unit is centered on a beam detector of the remote FSO communication unit.

11. A method of sending data from an FSO communication unit on a transmitted optical beam at a first wavelength and receiving data at the FSO unit on a received optical beam at a second wavelength different from the first wavelength, comprising:
    aligning paths of the transmitted optical beam with the received optical beam such that the paths extend through an aperture and are coincident exterior to the FSO unit;
    calculating a Tx/Rx boresight error between a position of the received optical beam and a direction of the transmitted optical beam, the Tx/Rx boresight error caused by at least one optical component between a transmit beam source and a position sensitive alignment sensor; and
    positioning the transmitted optical beam to be parallel to the received optical beam according to an alignment of the received optical beam, wherein the alignment of received optical beam is based on the position of the received optical beam minus the Tx/Rx boresight error.

12. The method of claim 11, further comprising separating the transmitted optical beam and the received optical beam to traverse separate paths within a portion of the FSO unit.

13. The method of claim 11, wherein the alignment is performed comprising the position sensitive alignment sensor that can be used to determine the position of the received optical beam relative to its center.

14. The method of claim 13, further comprising adding a value proportional to the Tx/Rx boresight error to a signal from the position sensitive alignment sensor to create an adjusted signal that offsets the Tx/Rx boresight error, and positioning the transmitted optical beam by centering the adjusted signal such that the received optical beam is offset from center by the Tx/Rx boresight error.

15. The method of claim 14, further comprising forming the receive optical beam such that a diameter of the receive optical beam on the position sensitive alignment sensor is 40-50% of a diameter of the position sensitive alignment sensor.

16. The method of claim 11, further comprising an electronic boresight compensation (EBC) approach to compensate for the Tx/Rx boresight error.

* * * * *